(No Model.)
J. L. JÖNSSON.
JOURNAL BOX.
No. 479,983. Patented Aug. 2, 1892.
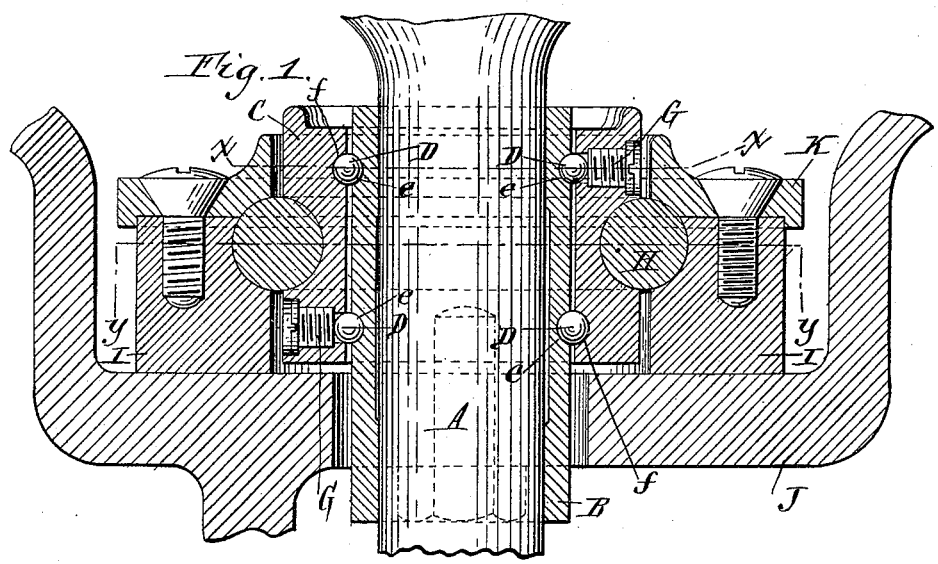
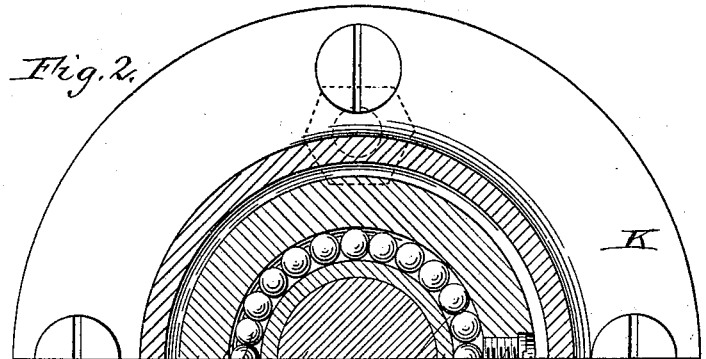
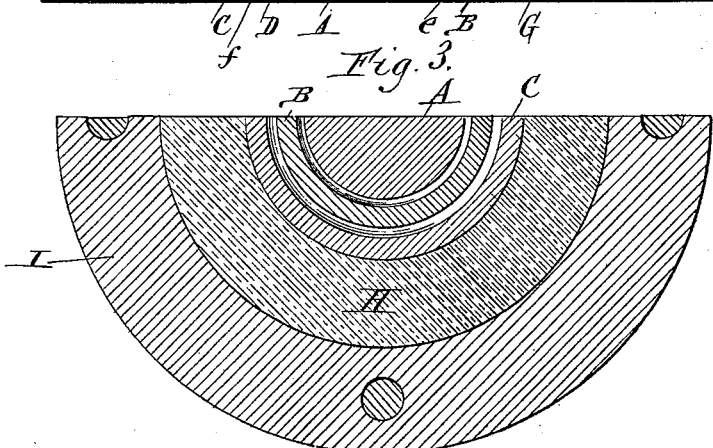
Witnesses:
Friedrich Gustav Wilhelm
Fred. C. Geyer
J. L. Jönsson Inventor
By Wilhelm Bonner
Attorneys ic lateral support. The circular frame is pro-
UNITED STATES PATENT OFFICE.

JOHAN LUDVIG JÖNSSON, OF STOCKHOLM, SWEDEN, ASSIGNOR TO THE AKTIEBOLAGET SEPARATOR, OF SAME PLACE.

JOURNAL-BOX.

SPECIFICATION forming part of Letters Patent No. 479,983, dated August 2, 1892.

Application filed November 23, 1891. Serial No. 412,767. (No model.)

*To all whom it may concern:*

Be it known that I, JOHAN LUDVIG JÖNSSON, a subject of the King of Sweden and Norway, residing at Stockholm, Sweden, have invented new and useful Improvements in Journal-Boxes, of which the following is a specification.

This invention relates to journal-boxes which are employed for supporting shafts or spindles running at a very high speed, and has the object to enable such shafts or spindles to run with little friction, although the parts which are mounted upon such shaft or spindle may not be perfectly balanced.

In the accompanying drawings, Figure 1 is a sectional elevation of a journal-box provided with my improvement. Fig. 2 is one-half of a horizontal section on line $x\ x$, Fig. 1. Fig. 3 is one-half of a horizontal section on line $y\ y$, Fig. 1.

Like letters of reference refer to like parts in the several figures.

A represents a vertical spindle—for instance, that of a centrifugal separator.

B represents a bushing, which surrounds the spindle and in which the latter turns.

C represents a cylindrical box or sleeve, which surrounds the bushing and which supports the latter by two rows of anti-friction balls D, arranged in grooves $e\ f$, formed, respectively, in the outer side of the bushing and the inner side of the sleeve. These balls are preferably introduced into their grooves through openings formed in the outer portion of the sleeve and closed by screw-plugs G.

H represents a rubber ring, preferably round in cross-section, which is arranged between the sleeve C and a fixed circular frame I, surrounding the latter. The lower portion of this frame I is firmly secured to the main frame J of the machine by screw-bolts, which are shown in dotted lines in Figs. 1 and 2, or by other suitable means. The inner side of the circular frame I and the outer side of the sleeve are provided with grooves, in which the rubber ring is seated. The internal opening of the circular frame is so much larger than the sleeve arranged therein that the latter has sufficient freedom of movement laterally to follow the swaying movement of the spindle, which movement is, however, resisted by the rubber ring, which acts as a cushion or elastic lateral support. The circular frame is provided with a removable cap K and the groove in which the rubber ring is seated is formed partly in the lower portion of the frame and partly in the cap.

The spindle is free to move vertically in the bushing and to turn therein and the bushing is free to turn in the surrounding sleeve. The rotation takes place between the parts which offer the least resistance, so that either the spindle may turn in the bushing or the bushing may turn with the spindle in the surrounding sleeve. Ordinarily the spindle and bushing rotate in the sleeve; but if one of the balls should break and the bushing should stick the spindle will rotate in the bushing. The tendency to develop excessive friction is reduced to a minimum by the elastic lateral support of the sleeve, which permits the spindle to sway laterally and prevents binding.

I claim as my invention—

The combination, with the spindle, of a bushing surrounding the same, a sleeve surrounding the bushing, anti-friction balls interposed between the sleeve and the bushing, a fixed frame surrounding the sleeve, and an elastic support interposed between the sleeve and the frame, substantially as set forth.

Witness my hand this 5th day of November, 1891.

JOHAN LUDVIG JÖNSSON.

Witnesses:
E. HAASE,
FELIX HEDMAND.